Patented Dec. 18, 1951

2,579,300

UNITED STATES PATENT OFFICE 2,579,300

CHLORINATED PINANE INSECTICIDAL COMPOSITION

George Allen Buntin, Wilmington, Del., assignor to Hercules Powder Company, Wilmington, Del., a corporation of Delaware No Drawing. Original application August 4, 1945, Serial No. 609,027. Divided and this application April 8, 1948, Serial No. 19,869

8 Claims. (Cl. 167—30)

This invention relates to an insecticidal composition and more particularly to an insecticidal composition containing a polychloro pinane as the toxic ingredient.

Among the more commonly used insecticidal toxicants are the naturally occurring products, pyrethrum, rotenone, and nicotine. These natural products have the very great disadvantage of not being uniform in their insecticidal activity. Many synthetic products have been suggested in the past as substitutes for these toxicants; however, they are usually lacking in one respect or another. They do not have a high enough killing power and must be used in concentrations which cause irritation to the user, or, if they are sufficiently toxic, they are also toxic to forms of animal life other than insect pests.

Now in accordance with this invention it has been found that insecticidal compositions containing as the toxic ingredient a polychloro pinane, having a chlorine content of from about 40% to about 75%, possess an unusual degree of insecticidal activity. Because of the very high killing power of the polychloro pinanes, extremely dilute solutions of these toxicants are effective.

The following examples will illustrate the preparation of these polychloro pinanes and the insecticidal activity of compositions containing them. In these examples, the test for insecticidal activity against houseflies was made in the following manner and is referred to in this specification as the bell jar method.

Approximately 100 five-day old flies (Musca domestica) were placed in a bell jar and a predetermined quantity of the insecticide to be tested was atomized into the bell jar. The quantity of insecticide used was equal to the amount of the Official Test Insecticide which was necessary to give a 30 to 55% kill and must be within the limits of 0.25 to 0.35 cc. After spraying the insecticide into the chamber the flies were placed in an observation cage containing a wad of cotton wet with a concentrated sugar solution. At the end of 24 hours the number of dead and moribund flies were counted. All tests were carried out at 80°–90° F. and 50–70% relative humidity.

EXAMPLE 1

One part of pinane dissolved in 5 parts of carbon tetrachloride was placed in a chlorination vessel and exposed to ultraviolet illumination. Chlorine was passed into the agitated mixture and the solution refluxed from the heat of the reaction. After 22 hours of chlorination samples were taken periodically, a total of 4 samples being taken. The carbon tetrachloride was removed from each sample by distillation under reduced pressure. The material which remained was dissolved in petroleum ether and this solution was washed with a sodium bicarbonate solution and with water, dried and the solvent removed. The products were viscous yellow liquids which were analyzed for their chlorine content. The results of testing 1% solutions in Deo-Base of each of the polychloro pinanes for their insecticidal activity against houseflies by the bell jar method are given in the following table.

*Bell jar tests on flies*

| Chlorination Time in Hrs. | Per Cent Chlorine | Per Cent Dead in 24 Hrs. | O. T. I. Difference |
|---|---|---|---|
| 22 | 57.6 | 75 | +23 |
| 26 | 63.1 | 99 | +47 |
| 30 | 68.2 | 100 | +48 |
| 38 | 71.0 | 100 | +48 |

EXAMPLE 2

Various quantities of a polychloro pinane containing 68.8% of chlorine were added to a household-type base oil solution containing 100 mg. total pyrethrins per 100 ml. and tested by the bell jar method against the housefly. Results of these tests are:

| Per Cent Polychloro Pinane Added to Pyrethrin Solution | Per Cent Dead in 24 Hrs. | O. T. I. Difference |
|---|---|---|
| 0 | 36.3 | 0 |
| 0.2 | 54.8 | +18.5 |
| 0.5 | 85.8 | +49.5 |
| 0.8 | 94.0 | +57.7 |

Any polychloro pinane containing from about 40% to about 75% chlorine may be used as the toxic ingredient of the insecticidal compositions of this invention. The polychloro pinanes may be prepared by chlorinating pinane or pinene hydrochloride. However, in chlorinating pinene hydrochloride the chlorination must be carried out at a temperature below about 20° C., to avoid rearrangement of the pinene hydrochloride. The chlorination may be carried out in the presence or absence of a solvent. Lower temperatures are maintained during the chlorination, if a solvent is used; however, in some instances it is preferable to use high temperatures in order to obtain the desired degree of chlorination. Suitable solvents for the chlorination are chloroform, carbon tetrachloride, pentachloroethane, etc. A chlorination catalyst may be used if desired. Ultraviolet light is particularly efficient.

The chlorinated pinanes in accordance with this invention should contain an amount of chlorine of from about 40% to about 75% and preferably from about 60% to about 72%. As may be seen from the foregoing examples, polychloro pinanes having a chlorine content within the preferable range have a very high insecticidal activity. Chlorinated pinanes having a chlorine content of less than 40% are so inactive as to be worthless as insecticides. The same thing is true for polychloro pinanes having a chlorine content above 75%, as the insecticidal activity decreases greatly as the chlorine content is raised above this point.

The insecticidal compositions of this invention may be made up of the polychloro pinane admixed with any suitable type of diluent. If a liquid spray is desired, the polychloro pinane may be dissolved in any convenient solvent, such as kerosene or Deo-Base, or it may be dispersed in water to form aqueous sprays. Insecticidal dusts may be prepared by placing the polychloro pinane on a diluent or carrier such as powdered carbon, kieselguhr, bentonite, pyrophyllite, etc.

For many purposes it may be desirable to use the polychloro pinane in combination with other insecticidal toxicants. Many toxicants have a very high knockdown in relatively dilute solutions, but much higher concentrations must be used in order to obtain the desired degree of kill. Due to the very high degree of killing power which the polychloro pinanes possess, these compounds may be added to such toxicants, thereby enabling the use of much more dilute solutions than would otherwise be possible. Toxicants with which these polychloro pinanes may be combined include such compounds as rotenone, pyrethrum, and organic thiocyanates such as alkyl thiocyanates, thiocyano ethers such as beta-butoxyl-beta'-thiocyanoethyl ether, and terpene thiocyanoacylates such as isobornyl thiocyanoacetate, fenchyl thiocyanoacetate, and isobornyl alpha-thiocyanopropionate.

As may be seen from the foregoing examples, the polychloro pinanes have an extremely high insecticidal activtiy. Thus, the insecticidal compositions of this invention may contain any amount of the polychloro pinane that is effective against the pest being killed. For a general household insecticide 1 to 2% solution might be desired. However, for killing many types of pests it will be desirable to use much higher concentrations of these toxicants.

The insecticidal compositions of this invention are useful in combatting flies, mosquitoes, roaches, moths, carpet beetles, bed bugs, and many other pests.

This application is a division of my application for United States Letters Patent Serial Number 609,027, filed August 5, 1946, now abandoned.

What I claim and desire to protect by Letters Patent is:

1. An insecticidal composition comprising the product obtained by the chlorination of pinane with chlorine gas at an elevated temperature, below the temperature at which the product decomposes, to a chlorine content of from about 40% to about 75% chlorine and an insecticidal adjuvant as a carrier therefor.

2. An insecticidal composition comprising the product obtained by the chlorination of pinane with chlorine gas at an elevated temperature, below the temperature at which the product decomposes, to a chlorine content of from about 60% to about 72% chlorine and an insecticidal adjuvant as a carrier therefor.

3. An insecticidal composition comprising the product obtained by the chlorination of pinane with chlorine gas at an elevated temperature, below the temperature at which the product decomposes, to chlorine content of from about 40% to about 75% chlorine and a solid insecticidal adjuvant as a carrier therefor.

4. An insecticidal composition comprising the product obtained by the chlorination of pinane with chlorine gas at an elevated temperature, below the temperature at which the product decomposes, to a chlorine content of from about 40% to about 75% chlorine and a hydrocarbon solvent insecticidal adjuvant as a carrier therefor.

5. An insecticidal composition comprising an aqueous insecticidal dispersion of the product obtained by the chlorination of pinane with chlorine gas at an elevated temperature, below the temperature at which the product decomposes, to a chlorine content of from about 40% to about 75% chlorine.

6. An insecticidal composition comprising the product obtained by the chlorination of pinane with chlorine gas at an elevated temperature, below the temperature at which the product decomposes, to a chlorine content of from about 60% to about 72% chlorine and a solid insecticidal adjuvant as a carrier therefor.

7. An insecticidal composition comprising the product obtained by the chlorination of pinane with chlorine gas at an elevated temperature, below the temperature at which the product decomposes, to a chlorine content of from about 60% to about 72% chlorine and a hydrocarbon solvent insecticidal adjuvant as a carrier therefor.

8. An insecticidal composition comprising an aqueous insecticidal dispersion of the product obtained by the chlorination of pinane with chlorine gas at an elevated temperature, below the temperature at which the product decomposes, to a chlorine content of from about 60% to about 72% chlorine.

GEORGE ALLEN BUNTIN.

REFERENCES CITED

The following references are of record in the file of this patent:

UNITED STATES PATENTS

| Number | Name | Date |
| --- | --- | --- |
| 1,366,106 | Weeks | Jan. 18, 1921 |
| 2,010,841 | Bender | Aug. 13, 1935 |
| 2,337,043 | Hasselstrom et al. | Dec. 21, 1943 |

OTHER REFERENCES

Simonsen, "The Terpenes," vol. II, pp. 142, 143, and 281 (1932).

Desalbres et al., Chimie and Industrie, vol. 58, pages 443–448 (1947), thru Chem. Abst., vol. 42, page 2719 (1948).

Roark, "A Second Index to Patented Mothproofing Materials," U. S. D. A. Bureau of Chemistry and Soils, Insecticide Division, February 1933, page 84, 167–37.

Frankforter, J. Am. Chem. Soc., vol. 28, p. 1461–1465 (1906).